Figure 1:
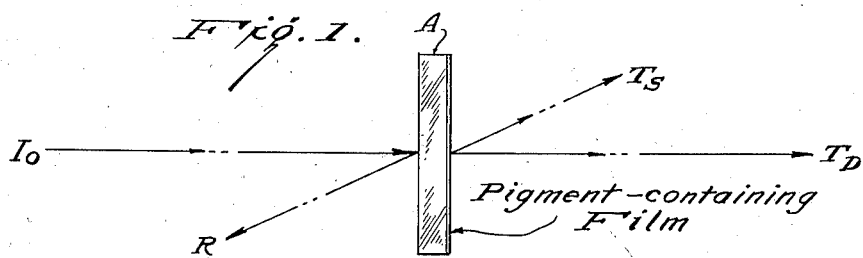

June 26, 1951

G. C. MARCOT ET AL 2,558,303

PRODUCTION OF IRON OXIDE PIGMENTS

Filed Aug. 7, 1947

WHERE: $I_O = A + R + T_S + T_D$ $T_T$ (Visual total transmission) $= T_S + T_D$ Transparency $= \dfrac{T_D}{T_S + T_D}$ or $\dfrac{T_D}{T_T}$.

INVENTORS
GUY C. MARCOT,
WINFRED J. CAUWENBERG,
STEPHEN A. LAMANNA,
BY
Wm. P. Spielman
ATTORNEY Patented June 26, 1951

2,558,303

UNITED STATES PATENT OFFICE 2,558,303

PRODUCTION OF IRON OXIDE PIGMENTS

Guy C. Marcot, Lynchburg, Winfred J. Cauwenberg, Piney River, and Stephen A. Lamanna, Amherst, Va., assignors to American Cyanamid Company, New York, N. Y., a corporation of Maine Application August 7, 1947, Serial No. 767,070

11 Claims. (Cl. 106—304)

The present invention relates to a method of preparing iron oxide pigments, and relates more particularly to a method of controlling and directing the crystal growth habits of the individual iron oxide particles.

It has long been recognized by the art that various iron oxide pigments are well adapted for use as coloring materials where it is desirable that light-fastness be one of the characteristics of the coating material. The prior art has also recognized that, under various conditions of manufacture, it is possible to produce iron oxide pigments ranging in color from a light lemon-yellow to a dark reddish-brown and that black pigments might also be produced. Iron oxide pigments have also been quite desirable from an economic standpoint, in that they may ordinarily be manufactured from waste products such as scrap iron, spent ferrous sulfate, mine waters, pickling liquors, and the like sources of waste materials which would otherwise present a serious disposal problem.

Inasmuch as it is a recognized fact that the coating ability of any pigment is dependent, among other things, on the refractive index and size of the individual particles and the coextensive surface area thereof, it has long been known that the most desirable iron oxide pigment would be obtained when the particles thereof were of optimum uniformity as regards size distribution. In order to obtain such pigment, it has been recognized that control over several operating conditions was necessary, i. e., acidity of the reaction medium, rate of oxidation, reaction temperatures, and the like.

Heretofore the preferred method of manufacturing the yellow to red iron oxide pigments has been based on the oxidation of ferrous sulfate solutions under controlled acid conditions. In most processes the acidity of the solution is maintained at a pH of about 3.5 either by the presence of metallic iron, which reacts with the acid liberated by the oxidation, or by adding alkaline materials such as sodium carbonate or sodium hydroxide. Acidic conditions were used because it was well known that oxidation of the ferrous iron was incomplete at higher pH values, and that under conditions approacihng or slightly exceeding neutrality there were formed dark ferri-ferro compounds instead of the desired, clean colored hydrated ferric oxides.

It has previously been possible, according to some of the above described methods, to produce iron oxide pigments of a hydrous amorphous nature which were applicable in the production of transparent coating films. Because of their amorphous character, it has heretofore been necessary to incorporate such iron oxide pigments into coating compositions by various well-known flushing treatments wherein the wet pigment is directly transferred to the final vehicle. It has been impossible to produce such iron oxide pigments, possessing the characteristics of transparency when incorporated in coating films, in a dry condition due to the fact that the pigments agglomerate during the drying treatment and are thereafter incapable of being adequately redispersed in the final vehicle.

The present invention is based on the discovery that crystalline iron oxide pigments of light yellow to deep brownish orange shades consisting of particles of such exceptionally small size that when they are incorporated in clear coating compositions the final film exhibits greatly improved transparency due to the slight light-scattering effect of the pigments, may be produced by carrying out the oxidation of iron under alkaline conditions when the controlled factors hereinafter described are observed.

Moreover, an outstanding feature of our invention resides in the provision of a method whereby dry iron oxide pigments having an average particle size of less than about 0.1 micron diameter may be produced. The dry powders contain substantially no aggregates of iron oxide crystals and are characterized by their freedom from lumping or agglomerating under adverse storage conditions such as, for instance, storage in a warm, moist atmosphere. It will be evident that such dry iron oxide pigments, which are capable of producing transparent coating films, will have many commercial uses such as, for instance, in the production of printing inks, transparent coatings for the canning industry, decorative finishes in the automotive industry, and the like uses.

In its broadest aspects, our invention comprises the steps of first adding a ferrous salt such as ferrous chloride or ferrous sulfate to a water solution of an alkali metal carbonate containing at least 100% of the stoichiometric requirement, which precipitates the iron, followed by oxidation of the precipitate. The oxidation of the precipitated iron compound may be carried out over a period of time within the range of from about 15–30 minutes to about 10 hours or more depending on the desired size and degree of transparency of the final pigment and at temperatures lower than 40° C. The final product thus produced will be composed substantially entirely of individual iron oxide crystals of 0.1 micron or less in average diameter.

We have also found that the particle size range of the pigment may be most closely controlled and regulated to provide optimum uniformity and size of the particles by carrying out the oxidation of the precipitated ferrous compounds in the presence of compounds capable of forming complexes with hydrated iron oxide. The most highly active crystal growth directors are sodium silicate or other form of active silica, tartaric, citric or tannic acid or water-soluble salts thereof, or water-soluble zinc salts. The preferred amounts of these materials to be added to the reaction medium are within the range of from about 0.1% to about 5% based on the weight of the $Fe_2O_3 \cdot H_2O$ equivalent of the iron salt present. The addition of amounts in excess of about 5% of these crystal growth directing materials does not in any way benefit the uniformity of particle size or the degree of transparency of the final product. The use of amounts up to 0.5% of any of these directors results in a decrease in the average particle size of the products; the employment of amounts of silica, tartaric acid, or tannic acid in excess of 0.5% of the $Fe_2O_3 \cdot H_2O$ equivalent of the iron salt not only decreases the particle size but also results in the production of a different crystal type iron oxide, which is characterized by its ability to provide transparent coating films which do not refract to any appreciable extent light transmitted therethrough.

The presence of a crystal growth director during the oxidation of the iron precipitate also enables us to prepare iron oxide pigments of any desired degree of transparency, having optimum uniformity of size of the individual particles. Thus for example the addition of from about 0.01% to about 1% of $SiO_2$ in the form of sodium silicate to an aqueous iron salt solution prior to a relatively long oxidation cycle under the above-described alkaline conditions will produce a light yellow-colored opaque iron oxide pigment having greatly improved tinting strength and mass tone characteristics in addition to a much more pleasing texture. In fact, it has been found that the presence of such a crystal growth director aids in the preparation of iron oxide pigments, having improved texture, tinting strength, and the like characteristics, according to some of the well-known prior art procedures wherein the oxidation of the iron salt is carried out under acid, neutral, or slightly alkaline conditions in producing opaque type pigments.

The employment of the above stated alkaline reaction conditions results in the production of slurries of crystalline iron oxide pigments which may be dried by ordinary low-temperature drying procedures with much less agglomeration of the particles than had been encountered with the amorphous pigments produced according to prior art methods.

We have also found that the presence of substantial quantities of anion, such as the sulfate or chloride ion, chemically combined in the iron oxide pigments is another important cause of aggregation of a finely divided iron oxide pigment during the low temperature drying of slurries thereof. By producing iron oxides of definite crystalline structure under our alkaline conditions and containing less than 1% and preferably less than 0.5% of combined anion we have succeeded in producing slurries of pigments of the requisite particle size for transparency which can be converted to substantially dry powder without agglomeration. However, in the production of such transparent iron oxide pigments, we have found that when the reaction temperature is allowed to exceed about 40° C. the product will contain an appreciable quantity of particles having an average diameter greater than 0.1 micron thus rendering the pigment unsuitable for incorporation into clear coating films exhibiting high transparency.

When the reaction temperature is above about 60° C. there is considerable likelihood of formation of dark-colored ferri-ferro compounds which discolor the pigment. Similarly, incomplete or insufficient oxidation of the ferrous iron leads to discoloration; therefore the aeration should be carried out at temperatures well below 60° C., and preferably not higher than about 40° C., while providing an excess of air or other oxidizing agent to ensure the production of a light-colored pigment. Precipitation of the ferrous compound and oxidation are preferably carried out in a container that is open to the atmosphere, since the use of a closed vessel interferes with the elimination of carbon dioxide during the oxidation and thus increases the danger of discoloring the product.

Although finely divided iron oxide pigments which are definitely crystalline in character and substantially free from combined anion can be dried from aqueous pulps to substantially dry powder containing from about 2% to about 6-7% of adsorbed mixture without substantial agglomeration, we have found that it is important to coat the pigment particles with a water-insoluble coating material. Such a coating provides protection against lumping or agglomeration of the dry pigments during storage. Moreover, it has been found that finely divided crystalline iron oxide pigments coated with a substantially monomolecular layer or film of a lyophilic organic coating material afford films possessing greatly increased transparency values due to the fact that they transmit a much greater proportion of light undeviated.

The materials which we have found to be most suitable as coating materials are those acids and esters of high acid number containing more than about 10 carbon atoms, such as coconut oil fatty acids, oleic acid, ricinoleic acid, tall oil fatty acids, naphthenic acid, lauric acid, myristic acid, various fish oil acids, and the like acid materials containing up to 22 carbon atoms, as well as various synthetic resins such as diethylene glycol modified castor oil-azelaic acid alkyd resins, non-oxidizing 2-ethylhexoic acid-pentaerythritol alkyd resins, rosin-dibasic acid type resins, terpene-dibasic acid type resins, and the like resins. These and similar materials are ordinarily used in the form of their alkali metal, ammonium, amine or other water-soluble or water-dispersible salts or soaps.

In carrying out this coating treatment, it is preferable that the amount of coating material to be used is within the range of from about 10% to about 100% based on the weight of the iron oxide pigment and dependent on the pigment specific surface area and the particular coating material employed. It has been determined that about 30% by weight of a ricinoleic acid coating material will afford a substantially monomolecular film on the particles of a pigment which has a specific surface area of about 150 square meters per gram. On filtering, washing, and drying such a coated pigment to a final moisture content of about 3-5%, the pigment exhibits no aggregates under a microscope at about 500 magnifications and the dried powder does not lump or agglomerate upon storage in a warm, moist atmosphere. In most instances, however, it is necessary to determine the specific surface area of the pigment to be treated with our preferred coating agents inasmuch as the use of amounts of coating agent appreciably in excess of that necessary to provide a substantially monomolecular film on the pigment will result in a product which is greasy and sticky and consequently difficult to filter and grind.

As hereinbefore stated, one of the factors contributing to accurate regulation of the crystal growth habits of iron oxide is the oxidation rate. One of the methods by which the oxidation of iron salts in aqueous suspension may be hastened is by means of affording a greater or lesser amount of oxygen to the reaction medium. However, where an oxygen-containing gas is to be employed, the rate of addition of the gas to the reaction medium is dependent to a large extent on the size of the gaseous bubbles passed therethrough. When the size of these gaseous bubbles becomes too great, the effective use thereof is diminished in that a greater proportion of the oxygen merely passes through the reaction medium and to the atmosphere without effectively coming in contact with the iron compound. It is, therefore, of importance that the size of the bubbles of gaseous material passed through the reaction medium be maintained in as fine condition as possible. To this end it has been found that the addition to the reaction medium of a small amount of a frothing or surface tension reducing agent of the type well-known in froth flotation of minerals, such as sodium ricinoleate, pine oil, etc., is of great advantage in providing minute gaseous bubbles which are thereby enabled to come into relatively intimate contact with the iron present in the solution and thus more rapidly accomplish the oxidation thereof. It is to be understood, however, that the oxidation of iron compounds according to the method of this invention is not limited to the use of gaseous oxygen-containing materials. The oxidation of such compounds may be readily conducted by the employment of chemical oxidants such as hydrogen or sodium peroxide or sodium hypochlorite and the like oxidants.

In a specific embodiment of the invention, an aqueous solution of ferrous sulfate containing approximately the equivalent of 30 grams per liter of $Fe_2O_3 \cdot H_2O$ at a temperature of about 25° C. was added to a sodium carbonate solution in an amount of 150% of the stoichiometric requirement. Thereafter air was passed through the reaction mixture for about 3 hours while maintaining the temperature at about 25° C. after which time all of the ferrous ions had been converted to the ferric state. Saponified castor oil in an amount of about 30% of the weight of the precipitated iron oxide was added to the slurry and the mixture was agitated for a short time. Thereafter the mixture was acidified to about 6 pH, filtered, thoroughly washed with water, and dried at a temperature of about 40–70° C. to a moisture content of about 5%. The washed precipitate had an $SO_3$ content of about 0.06% calculated as sodium sulfate. When the dried coated pigment was incorporated in a clear lacquer coating composition the dried film so obtained was transparent.

Figure 2:
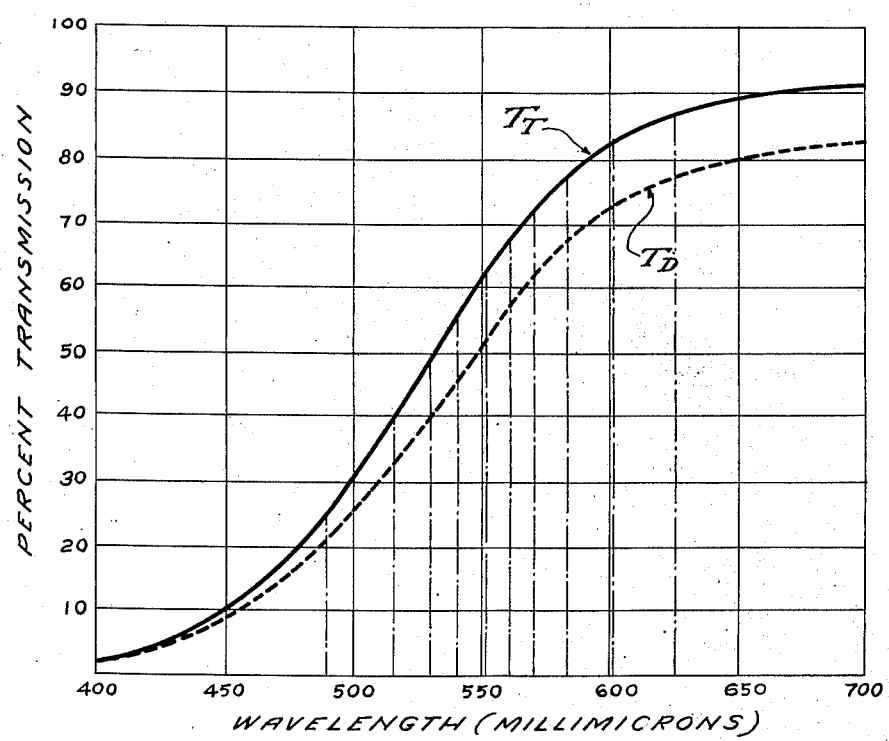

To more clearly define the term "transparent," as it is used in this description, reference will be had to the accompanying drawings. Fig. 1 is a diagrammatic representation of the transmission of a beam of light through a piece of plate glass coated with a film containing a partially transparent pigment, and Fig. 2 is a visual range transmission curve indicating the amount of light transmitted by a film containing a transparent iron oxide pigment at the various wave lengths of the visual spectrum.

In Fig. 1 it will be observed that part of the light striking the glass is reflected as shown by R. Another portion of the light, absorbed by the glass and film, is represented by A. The light which is transmitted emerges partially undeviated and partially scattered as represented in the drawing by $T_D$ and $T_S$ respectively. The total light transmitted ($T_T$) is the sum of $T_D$ and $T_S$. In defining visibility, only light which is transmitted is of importance and, therefore, that portion of the incident light which is reflected and/or absorbed may be disregarded. Therefore, the formula $$\frac{T_D}{T_T}$$

represents the visibility value of any pigment-containing film capable of transmitting light.

In measuring the amount of light which is transmitted by a film containing our novel iron oxide pigment, a beam of light is passed through a sheet of clear plate glass which has been coated with a film containing a small amount of the pigment and the total transmitted light and the direct transmitted light is measured spectrophotometrically over the entire visual spectrum (400–700 m$\mu$).

The data are obtained in the form of a graph such as that of Fig. 2 of the drawings. We have found it most convenient, in calculating the visibility of the radiant energy represented by the curves of Fig. 2 to employ those selected ordinates set forth on page 51 of the "Handbook of Colorimetry," by Arthur C. Hardy, 1936. These are 489.4, 515.1, 529.8, 541.4, 551.7, 561.8, 572.5, 584.8, 600.7 and 627.1 millimicrons.

It will be understood by those skilled in the art that these selected ordinates have been so chosen as to give visibility values which are those that the standard observer would see when the samples are irradiated by light having the spectral quality of illuminant C, the characteristics of the standard observer and illuminant C having been established by the International Commission on Illumination. In computing the transparency or visibility values, the sum of the values of $T_D$ for these selected ordinates is divided by the sum of the values of $T_T$, as shown for example in Fig. 2.

It will be apparent that those pigmented films which present the highest figures are those which transmit undeviated the greater portion of light and which are therefore more truly non-light-scattering than those having relatively smaller $$\frac{T_D}{T_T}$$

values. It has been found that only those pigments which afford pigmented films having visibility values of 75 or more may be regarded as being highly transparent. Those pigments giving lower values, while capable of producing films which transmit sufficient light so as to render them adequate for certain purposes produce films which still present a somewhat murky appearance, indicating that the individual particles are too large, or that some aggregation of the pigment particles has occurred.

The method we have employed to determine the degree of transparency of our novel iron oxide pigments has been chosen because of the facility with which such measurements may be made and because the standard films containing our pigments are comparable to those employed by industry and thus present a valuable and accurate index of the practical merits of each of the pigments. It will be seen from the formula by which the values of our novel iron oxide pigments are obtained that transparency or visibility is a function of light scattering of the pigment. Thus, for pigments possessing high transparency or visibility values, the thickness of the pigmented coating films is of no consequence. However, when the transparency or visibility value of the pigmented film is relatively low, the thickness of the film becomes quite important. For this reason the standard film described herein, and employed in the examples, is ordinarily one having a wet thickness of 0.005 inch. However, we have also demonstrated that the pigment concentration in the coating films may be varied within wide limits. Samples of the various dried finished pigments were ground in a volatile organic solvent such as toluene, xylene, benzene, and the like solvents, and the pastes produced were spread out on sheets of clear plate glass. When the solvent had evaporated, the films obtained consisted of about 70% pigment and about 30% of finishing materials which have hereinbefore been fully described. The transparency of visibility values of these concentrated pigment films were consistently greater than 85, thus indicating that our novel iron oxide pigments are finely dispersed and substantially free of aggregates in the coating films prepared therewith.

From the foregoing description it will be seen that the outstanding features of the present invention are:

(1) Maintenance of the reaction temperature at all times below about 40° C.

(2) Carrying out the oxidation under alkaline conditions using at least 100% of the stoichiometric requirement of an alkali metal carbonate.

(3) Control of the combined anion content in the final product below 1% of the weight of the pigment.

(4) Coating the iron oxide pigment particles with a substantially monomolecular layer of an alkali-soluble, acid-insoluble lyophilic organic coating agent which is preferably a water-insoluble organic carboxylic acid or a water-insoluble organic carboxylic acid ester.

(5) Variation of the oxidation cycle within the range of from about ½ hour to about 10 hours, depending on the desired particle size and transparency of the final product.

(6) Regulating the uniformity of particle size of the product by the inclusion, where it is desired, of small amounts of a crystal growth director.

By the proper regulation of any one or any combination of these control features, we are enabled to regulate the growth and crystal-forming habit of iron oxide to obtain products comprising opaque, or semi-transparent, or transparent pigments consisting of substantially uniformly sized particles.

In the event that an iron oxide pigment produced according to the method of this invention is to be directly incorporated into a film-forming composition, it may be desirable, in some instances, to transfer the wet pigment into the vehicle without previous drying treatment. In such cases any of the ordinary flushing treatments may be resorted to. However, for most practical, economic purposes it will be readily understood that the iron oxide pigments are in most desirable marketable state when packaged as dry powders which may be easily redispersed in the final film-forming compositions. The above-described method of surface coating our novel iron oxide pigments permits the commercial preparation of such dry pigments and thus fulfills a long-felt demand of industry.

The following examples will more clearly illustrate the method of our invention, it being understood, however, that the examples are given for purposes of illustration only, the limits of the invention being defined by the appended claims. In the examples the term "copperas" means $FeSO_4.7H_2O$. The term "stoichiometric equivalent" as used in the foregoing description means the molecular equivalent of the ferrous component; i. e., the molecular equivalent of $FeSO_4$ or $FeCl_2$ is, for example, 1 mol of $Na_2CO_3$.

Example 1

(A) 188 gm. of copperas dissolved in $H_2O$ to one liter at 25° C. was added to 89.3 gm. of soda ash which had been dissolved to one liter at 25° C. The composite was mixed for 5 minutes and then the slurry was aerated at 25° C. for about 5 hours. Thereafter the slurry was adjusted to 6 pH, filtered and washed; the filterability of this slurry was very poor. The washed pulp was then dried at 40°–50° C., this relatively low temperature being selected to minimize aggregation. A yield of approximately 60 gm. of a hard and gritty pigment was obtained. The pigment had an $SO_3$ content of 0.05% calculated as $Na_2SO_4$.

The dried pigment was formulated into a lacquer at a concentration of 5% paste on the total nonvolatile content. When applied at a thickness of 0.005", the film had a transparency value of 79. However, upon storage in a moist atmosphere for several days, the pigment agglomerated to a considerable extent.

(B) The process of the above example was repeated with the exception that the slurry of precipitated iron oxide was treated with 30 gm. of ricinoleic acid. The mixture was adjusted to about 6 pH, thus inducing a heavy floc of the pigment which allowed it to be free settling. The treated slurry was then filtered and washed; the filterability was very good. Thereafter the washed pulp was dried and the dried cake was very soft and easily ground to powder form.

A lacquer was prepared similarly to that of the above example. The pigment-containing lacquer film had a transparency value of 90, and possessed a clean lemon-yellow color tone. Upon application over a reflecting background, an exceedingly pleasant decorative finish was obtained. When the lacquer film was examined under a microscope at 500 magnifications, it was apparent that the surface coating treatment had prevented the formation of aggregates. Storage of this pigment under adverse conditions did not affect its redispersibility, and lacquer films prepared therewith had transparency values equal to that of the freshly prepared pigment.

Example 2

198 gm. of copperas dissolved to one liter at 25° C. was added to 71 gm. of soda ash which had been dissolved to one liter at 25° C. The composite was aerated for about 3 hours at 45° C., which conditions approximate those of prior art procedures. The pigment thus obtained was flushed into a ricinoleic acid base by treating the washed slurry with 200% by weight of saponified castor oil and then acidifying to 5 pH to separate the pigment-oil paste from the water. This flushed pigment paste was evaluated in a lacquer at about 5% pigmentation on a non-volatile basis as an applied film at 0.005" thickness. Although its opacity was appreciably less than the regular commercial grades of synthetic yellow iron oxides, it was still entirely too opaque to be classed as a transparent type pigment, having a transparency value of about 60. Its color tone was also somewhat muddy and dirty when compared to a transparent yellow pigment. Even a lacquer prepared at only 2.5% pigmentation gave a muddy appearance when the film was viewed over a reflecting surface. The pigment analyzed 2.3% $SO_3$ calculated to $Na_2SO_4$.

*Example 3*

The procedure of Example 2 was repeated except that the aeration was conducted at 25° C. When the pigment thus produced was evaluated in a lacquer at 5% pigmentation as an applied film of 0.005" wet thickness, the film was essentially a transparent one, having a transparency value of about 80, and possessing a very pleasant lemon-yellow color tone. This result illustrates the fact, when compared to Example 2, that lower reaction temperatures than those set forth in the prior art procedures are required in the preparation of transparent iron oxide pigments.

*Example 4*

188 gm. of copperas dissolved to one liter at 25° C. was added to 143 gm. of soda ash which had been dissolved to one liter. The composite was heated and maintained at 40° C. over an aeration period of about 3 hours.

A lacquer film, containing 5% of the pigment so obtained and which had been treated with saponified castor oil according to the procedure of Example 2 had a transparency value of about 85. The pigment so-produced had an $SO_3$ content of 0.01% calculated as $Na_2SO_4$.

*Example 5*

188 gm. of copperas dissolved to one liter at 25° C. was added to 89 gm. of soda ash which had been dissolved to one liter at 25° C. Sufficient sodium silicate equivalent to 1.2 gm. $SiO_2$ was then added to the mixture. The composite was maintained at 25° C. over an oxidation cycle of about 8 hours.

The final product was finished as a dry product by surface treatment with ricinoleic acid according to the method of Example 1 (B). When evaluated in a lacquer film, it presented a transparent film having a transparency value of about 95, and possessed a clean yellow color tone. The pigment had an $SO_3$ content of 0.04% calculated as $Na_2SO_4$.

*Example 6*

188 gm. of ferrous sulfate dissolved to 500 ml. in water was added to 125 gm. of sodium bicarbonate dissolved in water to 1500 ml., the solutions being maintained at 25°–30° C. The ferrous sulfate solution was added slowly, over a period of about 5 minutes so that there was no overflow of $CO_2$ froth. Then the composite was mixed for 10 minutes after which it was aerated for 3.5 hours at 25°–27° C.

The oxidized slurry was treated with 36 gm. of saponified castor oil, acidified to 6 pH, filtered, water-washed, and dried at about 50° C. The so-obtained pigment had a sulfate content of 0.04% calculated to $Na_2SO_4$.

When the product was incorporated in a clear lacquer, a dried film thereof had a transparency value of 96 and the film was a clear rich yellow color.

What we claim is:

1. A method of producing a crystalline iron oxide pigment having improved uniformity of particle size which comprises adding a water-soluble ferrous salt to at least 100% of its stoichiometric equivalent of an aqueous solution of a water-soluble alkali metal carbonate at a temperature below 40° C., oxidizing the resulting suspension at a temperature below 40° C. within a period of time of from about 15 minutes to 10 hours until substantially all of the iron content of said suspension is converted to ferric state, the temperature and oxidation period being so correlated as to produce an iron oxide pigment characterized by a visibility value $$\frac{T_D}{T_T}$$

of at least 75 for unscattered transmitted light when measured in a film pigmented therewith having a wet thickness of about 0.005 inch where for wave lengths of 400 to 700 millimicrons $T_D$ equals amount of light transmitted undeviated and $T_T$ equals the sum of the amount of light transmitted but scattered and the light transmitted undeviated, said oxidation being carried out in the presence of at least 0.1%, based on the weight of the $Fe_2O_3 \cdot H_2O$ equivalent of the iron salt, of a member of the group consisting of water-soluble salts of silica and of zinc, and tartaric, citric, and tannic acid and water-soluble salts thereof.

2. A method according to claim 1 in which the alkali metal carbonate is sodium carbonate.

3. A method according to claim 2 in which the resulting iron oxide pigment particles are treated with a substantially molecular dispersion of a lyophilic coating agent whereby the pigment particles are coated with a substantially monomolecular layer of the lyophilic organic coating agent.

4. A method according to claim 3 in which the oxidation is carried out by passing air through the suspension for a time within the range of 15 minutes to 10 hours and at a temperature not higher than about 25° to 30° C., whereby a transparent pigmen is obtained.

5. A method of producing a crystalline iron oxide pigment which comprises adding a water-soluble ferrous salt to at least 100% of its stoichiometric equivalent of an aqueous solution of a water-soluble alkali metal carbonate at a temperature below 40° C., and then oxidizing the suspension at a temperature below 40° C. within a period of time of from about 15 minutes to 10 hours until substantially all of the iron content of the said suspension is converted to ferric state, thereby producing a crystalline iron oxide pigment characterized by a visibility value $$\frac{T_D}{T_T}$$

of at least 75 for unscattered transmitted light when measured in a film pigmented therewith having a wet thickness of about 0.005 inch where for wave lengths of 400 to 700 millimicrons $T_D$ equals amount of light transmitted undeviated and $T_T$ equals the sum of the amount of light transmitted but scattered and the light transmitted undeviated.

6. A method according to claim 5 in which the alkali metal carbonate is sodium carbonate.

7. A method according to claim 5 in which the resulting iron oxide pigment particles are treated with a substantially molecular dispersion of a lyophilic coating agent whereby the pigment particles are coated with a substantially monomolecular layer of the lyophilic organic coating agent.

8. A method according to claim 5 in which the water-soluble ferrous salt is ferrous sulfate.

9. The method which comprises adding a water-soluble ferrous salt to an aqueous solution containing at least 100% of its stoichiometric equivalent of an alkali metal carbonate, and oxidizing the iron content of the resulting suspension to the ferric condition within a period of time from about 15 minutes to 10 hours, both steps being carried out at a temperature below 40° C., washing the resulting slurry to remove water-soluble alkali metal salts and drying the washed material, thereby producing a dry, crystalline iron oxide pigment free from aggregates and characterized by a visibility value $$\frac{T_D}{T_T}$$

of at least 75 for unscattered transmitted light when measured in a film pigmented therewith having a wet thickness of at least 0.005 inch where for wave lengths of 400 to 700 millimicrons $T_D$ equals amount of light transmitted undeviated and $T_T$ equals the sum of the amount of light transmitted but scattered and the light transmitted undeviated.

10. A method of producing a transparent crystalline iron oxide pigment which comprises adding a water-soluble ferrous salt to an aqueous solution containing at least 100% of its stoichiometric equivalent of an alkali metal carbonate at a temperature not higher than about 25° C. to about 30° C., oxidizing the iron content of the resulting suspension to the ferric condition at a temperature not higher than about 25° C. to about 30° C. and during a time within the range of 15 minutes to 10 hours, treating the suspension of ferric oxide with a substantially molecular dispersion of a lyophilic organic coating agent whereby the iron oxide pigment particles are coated with a substantially monomolecular film of the lyophilic organic coating agent to prevent agglomeration thereof, and washing and drying the pigment.

11. A method according to claim 10 in which the water-soluble ferrous salt is ferrous sulfate.

GUY C. MARCOT.
WINFRED J. CAUWENBERG.
STEPHEN A. LAMANNA.

REFERENCES CITED

The following references are of record in the file of this patent:

UNITED STATES PATENTS

| Number | Name | Date |
| --- | --- | --- |
| 1,327,061 | Penniman et al. | Jan. 6, 1920 |
| 1,337,402 | Hemingway | Apr. 20, 1920 |
| 1,368,748 | Penniman et al. | Feb. 15, 1921 |
| 1,392,926 | Fireman | Oct. 11, 1921 |
| 1,832,417 | O'Brien | Nov. 17, 1931 |
| 2,111,727 | Plews | Mar. 22, 1938 |
| 2,335,760 | Hucks | Nov. 30, 1943 |
| 2,357,096 | Fireman | Aug. 29, 1944 |
| 2,384,579 | Vesce | Sept. 11, 1945 |

FOREIGN PATENTS

| Number | Country | Date |
| --- | --- | --- |
| 299,919 | Great Britain | Nov. 8, 1928 |
| 313,999 | Great Britain | June 21, 1929 |

OTHER REFERENCES

Mellor: "Comprehensive Treatise on Inorganic Chemistry," vol. 13, p. 838, 1934, Longmans, Green and Co.

Wood: "Physical Optics," pages 103 and 104, published by the MacMillan Co., 1936, New York city.

Handbook of Chemistry and Physics, 30th ed., page 2249, published by Chemical Rubber Publishing Co., 1946. Copyright, Cleveland, Ohio.